UNITED STATES PATENT OFFICE.

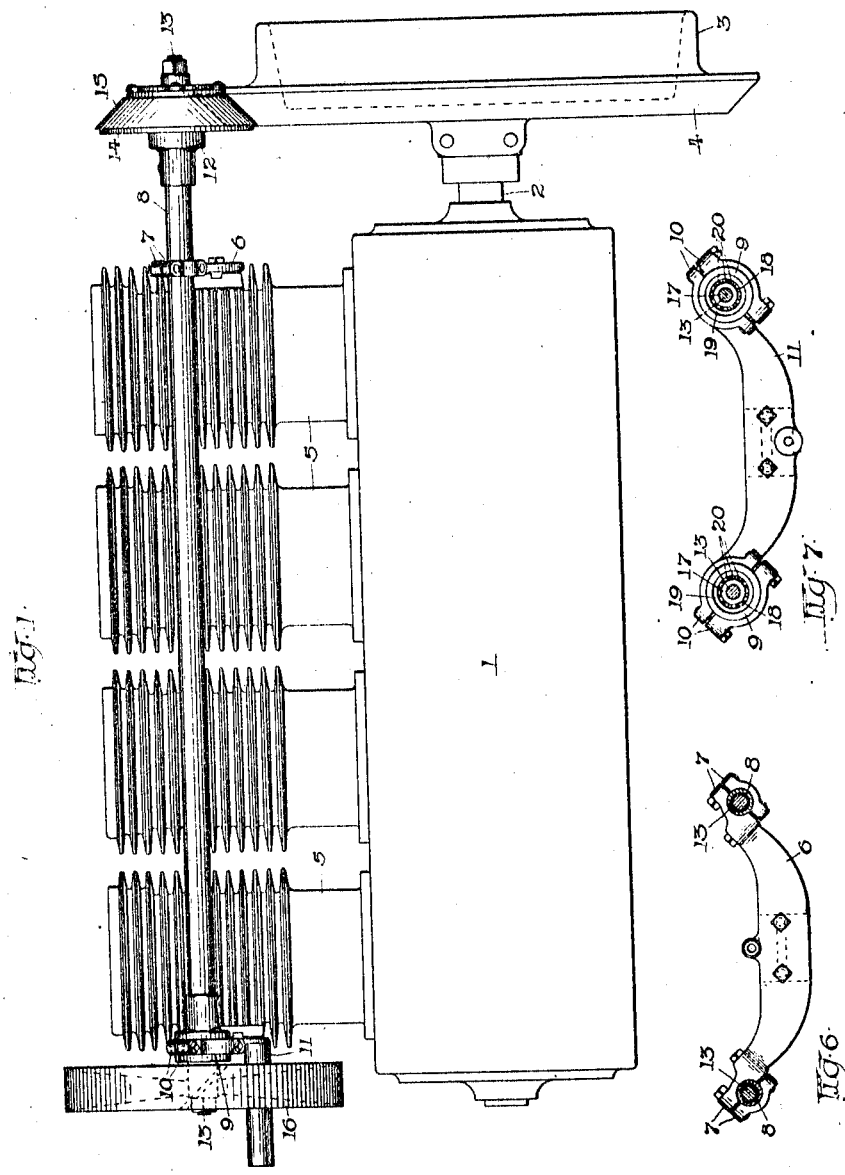

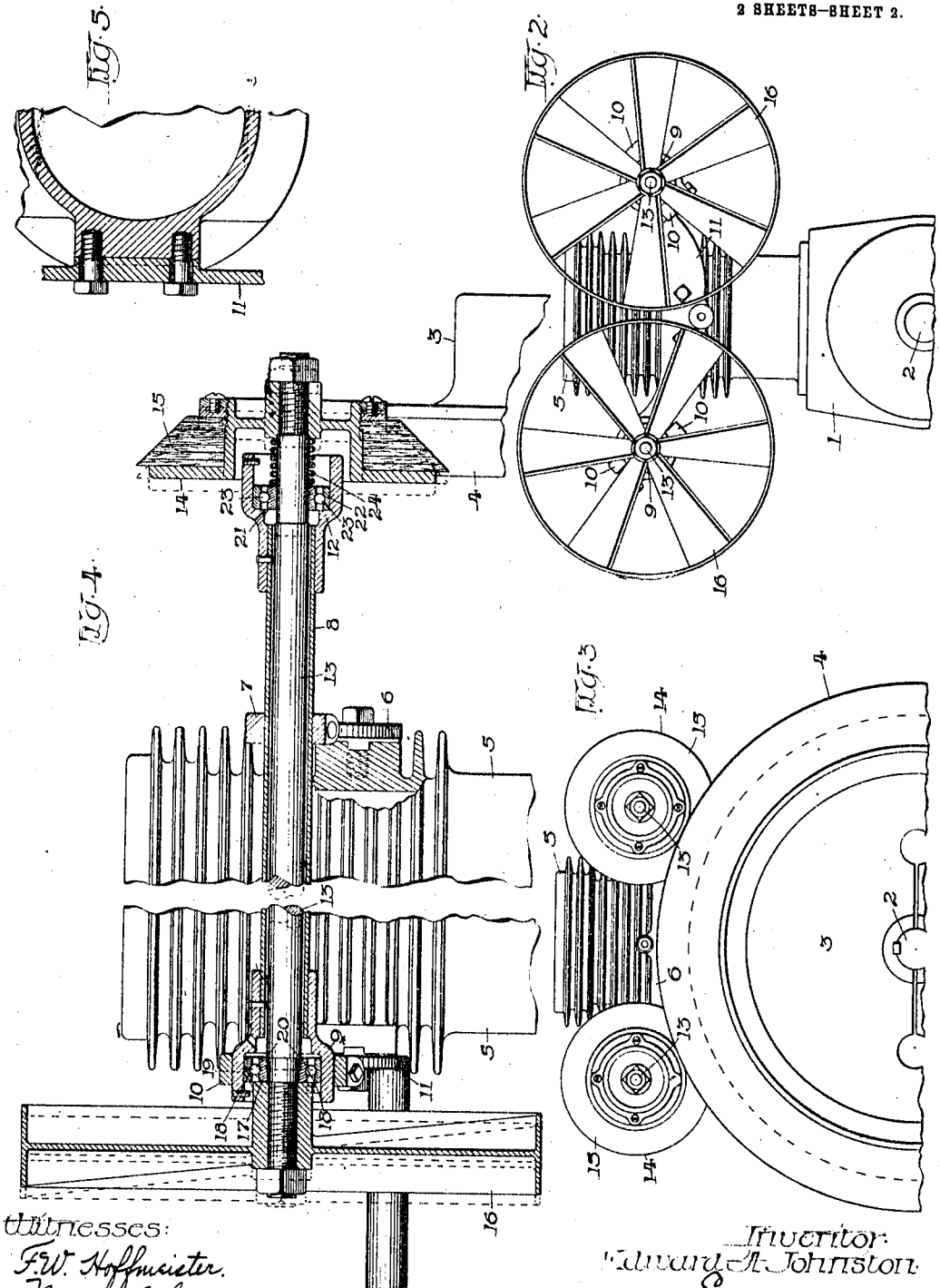

EDWARD A. JOHNSTON, OF AKRON, OHIO, ASSIGNOR TO INTERNATIONAL HARVESTER COMPANY, A CORPORATION OF NEW JERSEY.

COOLING-FAN FOR EXPLOSIVE-ENGINES.

990,139.

Specification of Letters Patent. Patented Apr. 18, 1911.

Application filed July 10, 1909. Serial No. 506,891.

*To all whom it may concern:*

Be it known that I, EDWARD A. JOHNSTON, a citizen of the United States, residing at Akron, in the county of Summit and State of Ohio, have invented certain new and useful Improvements in Cooling-Fans for Explosive-Engines, of which the following is a specification.

My invention relates to cooling fans, and in particular to automatic means for controlling the speed of their rotation, said means being actuated by the movement of the fan bodily under pressure of the air upon its wings; its object being to provide a mechanism that will automatically control the speed of the fan for the purpose of preventing injury thereto, due to excessive speed, when otherwise constructed. I attain this object by means of the mechanism illustrated in the accompanying drawings, in which—

Figure 1 is a side elevation of a multiple cylinder engine having my invention forming a part thereof; Fig. 2 is a partial end elevation of Fig. 1, showing the location of the fans; Fig. 3 is a partial end elevation of the same figure and designed to show the manner of transmitting motion to the fan shafts; Fig. 4 is a longitudinal section of a part of Fig. 1, designed to show the manner of mounting the fan shafts; Fig. 5 is a detail in section representing a partial end view of one of the engine cylinders and showing the manner of securing the fan shaft brackets thereto; Fig. 6 represents the supporting bracket for the fan shafts at the fly wheel end of the crank case; and Fig. 7 represents a similar bracket secured to the cylinder at the opposite end of the case.

Like reference characters designate the same parts throughout the several views.

1 represents the crank case, 2 the crank shaft mounted in suitable bearings therein, 3 a fly wheel secured to one end of the crank shaft and provided with a beveled rim portion 4 upon the side directed toward the crank case.

5 represents a series of vertically arranged engine cylinders mounted upon the crank case; 6 a bracket secured to the cylinder at the fly wheel end of the crank case, and having bearings 7 at opposite ends thereof, in which is secured one end of pipe sleeves 8 that extend longitudinally relative to the case upon opposite sides of the series of cylinders, having their opposite ends provided with enlarged portions 9 that are secured in bearings 10 at opposite ends of a bracket 11 similar in form to bracket 6 and secured to the cylinder at the opposite end of the crank case.

12 represents an enlarged sleeve portion secured to the opposite end of pipe 8, and 13 represents fan shafts received by the sleeves and having friction wheels 14 secured to their ends adjacent the fly wheel, said wheels being provided with beveled peripheries 15 adapted to contact with the beveled periphery of the fly wheel, as shown in Fig. 1, and 16 represents fans secured to the opposite ends of the shafts.

17 represents collars received by reduced portions of the fan shaft adjacent the inner end of the hub of the fan and provided with ball races 18 upon their peripheries.

19 represents rings loosely received by the sleeve portion 9 in a manner permitting them to slide longitudinally therein and provided with ball races upon their inner surfaces, the two ball races being adapted to receive balls 20 in a common way that form antifriction bearings between the pipe sleeve and fan shaft.

21 represents collars mounted loosely upon the opposite ends of the fan shafts and provided with ball races upon their peripheries, and 22 represents rings loosely received by the enlarged sleeve portions 12 and provided with ball races upon their inner surfaces that coöperate with complemental races upon the collars, and balls 23 form antifriction bearings for the fan shaft at the fly wheel end of the crank case. The pipe sleeves 8 are secured in the brackets, the fan shafts rotate within the pipes and are also permitted to have a limited longitudinal movement relative thereto, and 24 represents compression springs surrounding the shafts and operative between the collars 21 and the hubs of the friction wheels in a manner to move the fan shafts longitudinally and yieldingly press the friction wheels in contact with the rim of the adjacent fly wheel. The fan blades are inclined toward the cylinders in the direction of rotation of the fan, and in operation direct a current of air upon the cylinder.

It is desirable to have the fans rotate at maximum speed with the engine at normal but at a rate below its highest. As the speed of the fan increases the pressure of the air upon the blades becomes greater until it is sufficient to cause the fan shafts to move longitudinally against the pressure of the spring in a manner to cause the friction wheels to be released from contact with the fly wheel, as shown by dotted lines in Fig. 4, the rotation of the fan being automatically governed within certain limits by means of mechanism directly controlled by the rotative movement of the fans.

What I claim as my invention, and desire to secure by Letters Patent, is:

1. A cooling fan for engines including, in combination, a fan shaft, a fan secured thereto, an engine shaft, motion transmitting means connecting said engine shaft with said fan shaft, including speed controlling mechanism, said speed controlling mechanism being actuated by the rotative movement of the fan.

2. A cooling fan for engines including, in combination, a fan, a fan shaft mounted in bearings in a manner permitting a limited longitudinal movement thereof, an engine shaft, motion transmitting means connecting said engine shaft with said fan shaft, including speed controlling mechanism, said speed controlling mechanism being actuated by means of a longitudinal movement of said fan shaft.

3. A cooling fan for engines including, in combination, a fan, a fan shaft mounted in bearings in a manner permitting a longitudinal movement thereof, an engine shaft, motion transmitting means connecting said engine shaft with said fan shaft, including speed controlling mechanism, said speed controlling mechanism being actuated by means of a longitudinal movement of said fan shaft, said fan, by means of its rotative movement, controlling the longitudinal movement of said shaft.

4. A cooling fan mechanism including, in combination, a fan, a fan shaft mounted in bearings in a manner permitting a longitudinal movement thereof, an engine shaft, a fly wheel secured to said engine shaft, a friction wheel secured to said fan shaft and adapted to engage with said fly wheel when said fan shaft is moved longitudinally in one direction, and means controlled by the rotative movement of the fan and operative to move said shaft in an opposite direction.

5. A cooling fan mechanism including, in combination, a fan, a fan shaft mounted in bearings in a manner permitting a longitudinal movement thereof, an engine shaft, a fly wheel secured to said engine shaft and having a beveled rim portion, a friction wheel secured to said fan shaft and having a beveled rim portion adapted to engage with the beveled portion of said fly wheel when said fan shaft is moved longitudinally in one direction, and means, controlled by the rotative movement of the fan, operative to move said shaft in an opposite direction.

6. A cooling fan mechanism including, in combination, a fan, a fan shaft, an engine, including a power shaft, a fly wheel, bearings forming a fixed part of said engine and having said fan shaft mounted therein in a manner permitting a longitudinal movement thereof, a friction wheel secured to said fan shaft and adapted to engage with said fly wheel when said fan shaft is moved longitudinally in one direction, spring mechanism operative to yieldingly move said fan shaft in a direction to cause said friction wheel to engage with said fly wheel in opposition to a force created by a rotative movement of said fan and operative to move said shaft in an opposite direction.

7. A cooling fan mechanism including, in combination, a multiple cylinder engine including a crank case, engine cylinders mounted upon said crank case, an engine shaft, a fly wheel mounted upon said shaft, brackets secured to said cylinders at opposite ends of said crank case, pipe sleeves secured to said brackets upon opposite sides of said cylinders, fan shafts journaled in said sleeves in a manner permitting a longitudinal movement thereof, fans secured to one end of said shafts, friction wheels secured to opposite ends thereof and adapted to engage with said fly wheel when said fan shafts are moved in one direction, and springs operative to move said shafts longitudinally relative to said sleeves in a manner to yieldingly hold said friction wheels in engagement with said fly wheel.

EDWARD A. JOHNSTON.

Witnesses:
Geo. F. Klein,
W. E. Miller.